PHOTOSENSITIVE CODE READING SYSTEM

Filed Oct. 27, 1959

2 Sheets-Sheet 1

INVENTOR:
WILLIAM D. COCKRELL,

BY James J. Williams
HIS ATTORNEY.

INVENTOR:
WILLIAM D. COCKRELL,

BY James J. Williams
HIS ATTORNEY.

United States Patent Office 3,086,121

Patented Apr. 16, 1963

3,086,121

PHOTOSENSITIVE CODE READING SYSTEM

William D. Cockrell, Waynesboro, Va., assignor to General Electric Company, a corporation of New York Filed Oct. 27, 1959, Ser. No. 849,092
6 Claims. (Cl. 250—219)

Figure 2A:
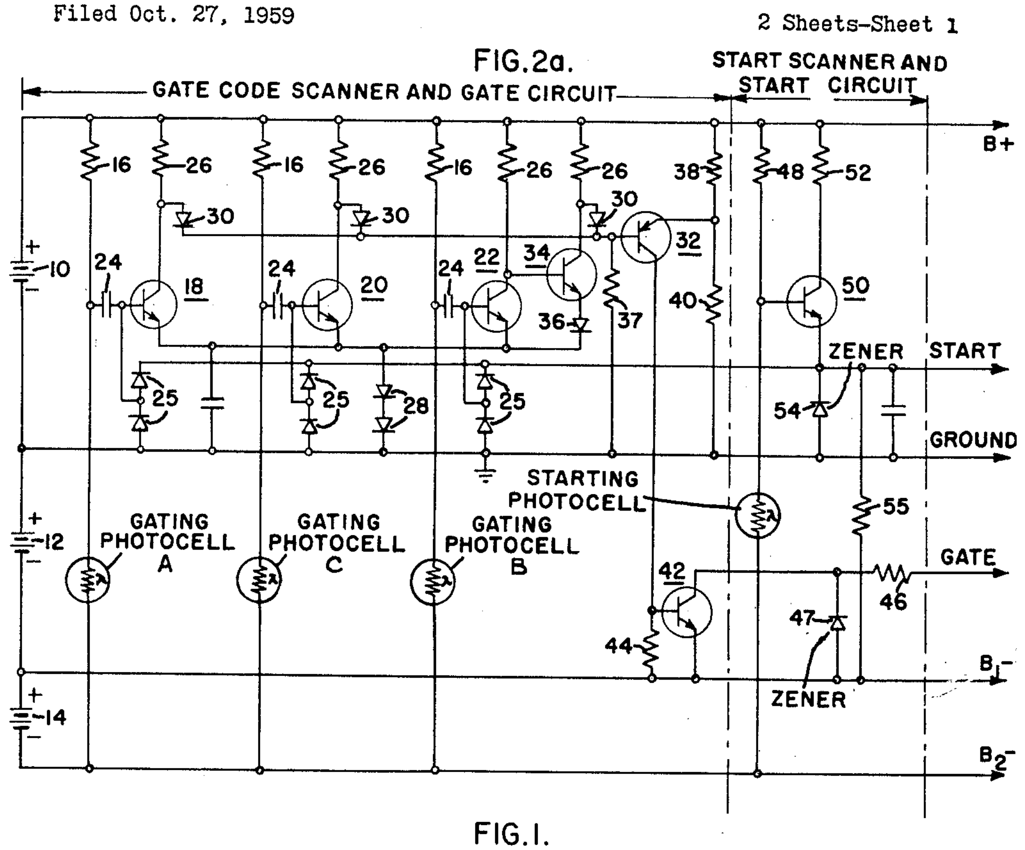

The invention relates to a code reading system, and particularly to a code reading system that simultaneously scans bits of coded indicia on an object and simultaneously produces output signals in response to these bits of coded indicia.

An object of the invention is to provide an improved code reading system.

Another object of the invention is to provide an improved code reading system that simultaneously scans bits of coded indicia on an object.

Another object of the invention is to provide an improved code reading system that simultaneously produces signals in response to bits of coded indicia on an object.

Another object of the invention is to provide an improved code reading system that simultaneously scans bits of coded indicia on an object and simultaneously produces signals in response to these bits of coded indicia despite widely varying intensities of the surrounding light prior to scanning.

Another object of the invention is to provide an improved code reading system that simultaneously scans bits of coded indicia on an object and simultaneously produces signals proportional to these bits of coded indicia despite slight differences in contrast between the coded indicia and the object.

Briefly, these and other objects are accomplished in accordance with the invention by a code reading system having a number of light sensitive devices each of which simultaneously scans a respective one of the bits of coded indicia on an object. The light sensitive devices simultaneously produce respective first signals in response to the bits of coded indicia, and these first signals are respectively coupled to readout circuits which produce output signals that are proportional to these first signals. The readout circuits simultaneously produce the output signals in response to a gating signal applied to each of the readout circuits. A gating circuit is coupled to each of the readout circuits for producing a gating signal at a predetermined time in order that the readout circuits may produce the output signals. The gating circuit may be made responsive to the presence of or responsive to the position of the object so that the output signals are producd at a desired time.

Figure 1:
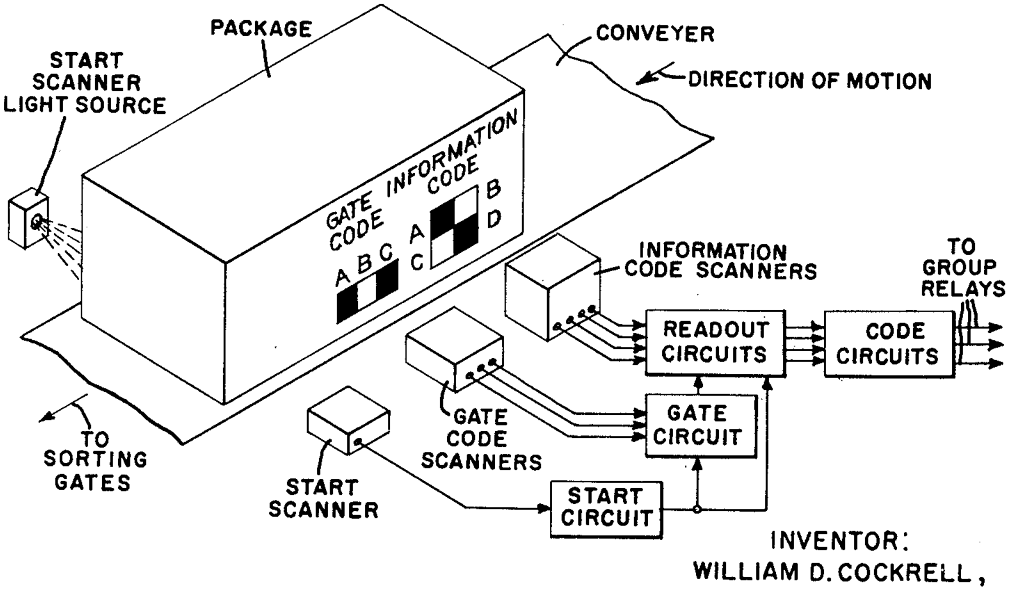
Figure 2B:
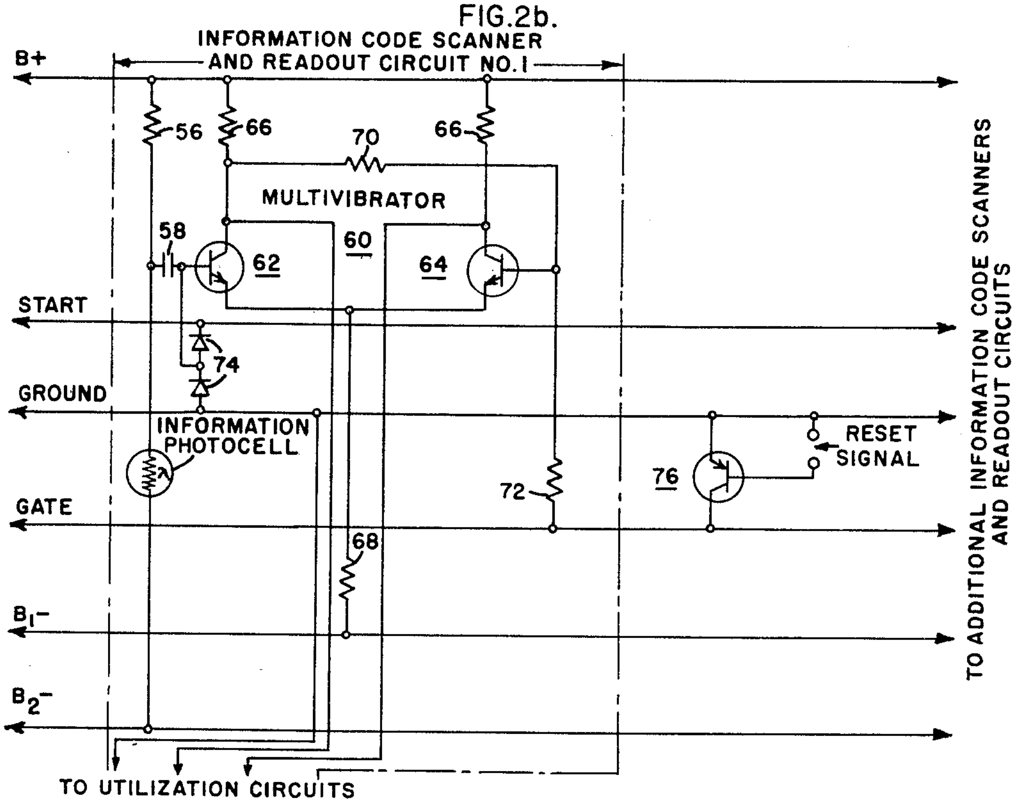
Figure 2C:
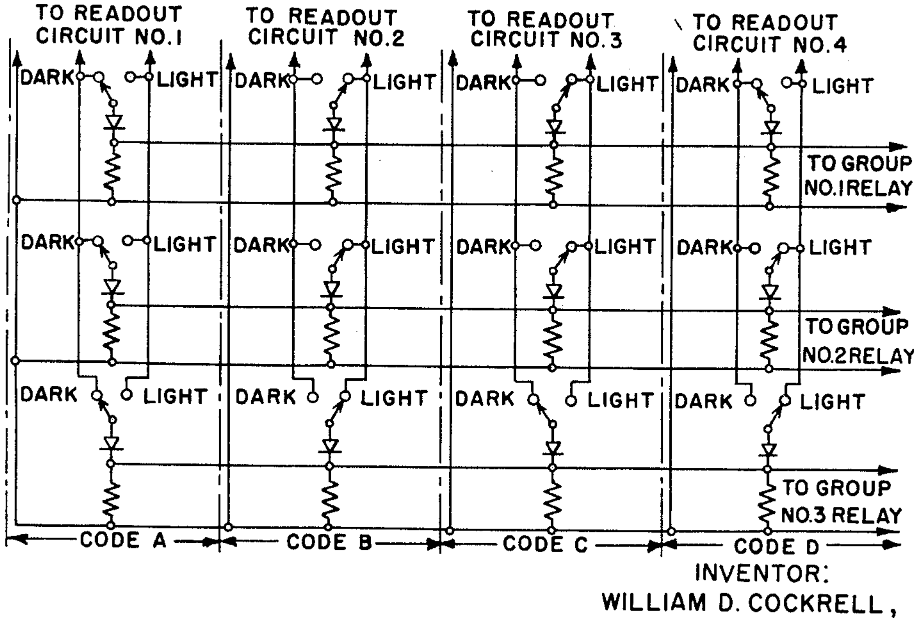

The invention will be better understood from the following description taken in connection with the accompanying drawing, and its scope will be pointed out in the claims. In the drawing:

FIGURE 1 shows a block diagram of a code reading system in accordance with the invention as used in connection with a conveyor for articles or packages; and FIGURES 2*a*, 2*b*, and 2*c* show a schematic diagram of the code reading system of FIGURE 1.

In FIGURE 1, a code reading system in accordance with the invention is shown as it might be used in connection with a warehouse conveyor which carries packages or articles from some source point in the warehouse to sorting gates (not shown) which are provided to route or sort the packages into two or more groups for distribution. The articles or packages are provided with codes in the form of bits of coded indicia. The bits of coded indicia may comprise areas, such as squares or rectangles, which are printed or painted or put on the package in some way. The areas may be either relatively dark or light in color with respect to the package, or the areas may be both dark and light in color with respect to the package. Generally, it is preferred that the light areas be the same color as the package. The combination of dark and light areas may be varied to convey any desired information. A gate code is provided on the package, and this gate code may comprise three bits of coded indicia in the form of three squares A, B, and C arranged in a line. An information code is also provided on the package, and this information code may comprise four bits of coded indicia in the form of four squares A, B, C, and D arranged in two rows of two squares each. One purpose of the gate code is to set the code reading system of the invention into operation so that the information derived from the information code may be passed through the code readinig system to a utilization circuit at a predetermined or at a desired time, thereby eliminating false operations and readings. In accordance with the invention, the gate and information codes are read or scanned by respective gate code scanners and information code scanners. These scanners each comprise a number of light sensitive devices, there being the same number and configuration of light sensitive devices as there are bits of coded indicia. Thus, the gate code scanners include three light sensitive devices arranged and spaced in a line to conform with the squares A, B, and C of the gate code. Likewise, the information code scanners include four light sensitive devices arranged and spaced to conform with the four squares A, B, C, and D of the information code. The light sensitive devices of each of the scanners are arranged and shielded from each other so that at a certain instant they effectively see or scan only the respective square associated with the light sensitive device. A start scanner and circuit are also provided for stabilizing the circuits associated with the gate code scanners and the information code scanners; and for enabling these circuits to produce a usable signal despite only slight differences in contrast between the coded indicia and the object, or between the dark and light areas of the coded indicia, immediately after these circuits have been exposed to widely varying light intensities. The start scanner includes a light sensitive device which, in the absence of a package, has a start scanner light source shining on it. However, when a package passes along the conveyor between the start scanner light source and the start scanner, light from the start scanner light source is removed from the start scanner to provide a start signal for the purpose just indicated.

By any suitable optical and illuminating means, it is possible for each of the light sensitive devices of the code scanners to scan its respective square and see either a dark square or a light square. As will be further explained, the code reading system of the invention utilizes the light sensitive devices in such a manner that a dark square reflects substantially no light and therefore a light sensitive device scanning such a dark square functions as a high resistance. Similarly, a light square reflects a substantial amount of light and therefore a light sensitive device scanning such a light square functions as a low resistance. In accordance with the invention, the light sensitive devices are positioned and arranged so that they are all capable of scanning their respective squares simultaneously or at the same time. If it has been previously determined that a gate code comprising a dark square A, a light square B, and a dark square C is required to activate the gate circuit so as to permit the readout circuits to produce signals, then the presence of such a combination of dark and light squares will cause the gate circuit to function in a manner which will be explained hereinafter. The light sensitive devices of the information code scanners are constantly scanning the package as it moves by, and, during the time that the squares of the information code are before the light sensitive devices, each of the light sensitive devices scans or sees either a dark or a light square. Various combinations of dark and light squares may be used to control certain utilization circuits such as the sorting gates. Thus, the combination of a dark square A, a light square B, a light square C, and a dark square D arranged in two rows as shown might be used to operate a certain relay that opens a particular sorting gate so that all packages having this information code would go into a certain desired group. The squares in the information and gate codes are all scanned or viewed simultaneously, a feature which permits the invention to be used in conveyers of widely varying speeds, and still provide accurate and reliable operation.

A schematic diagram of the code reading system shown in FIGURE 1 is shown in FIGURES 2*a*, 2*b*, and 2*c*. Leads in FIGURES 2*a*, 2*b*, and 2*c* having the same designation or legend are to be considered as being connected together. The various components of the code reading system shown in FIGURE 1 are generally indicated in FIGURES 2*a*, 2*b*, and 2*c*. These components will be separately discussed.

*Gate Code Scanner and Gate Circuit*

The gate code scanners shown in FIGURE 2*a* comprise three light sensitive devices such as the gating phototubes or photocells A, B, and C. While these photocells may be of various types, one preferred type comprises a device whose resistance varies with the intensity of the light striking it, and hence is represented schematically by a resistance and the Greek letter λ. The gating photocells A, B, and C are connected across a power circuit for the code reading system. The power circuit comprises a first source of unidirectional potential 10, a second source of unidirectional potential 12, and a third source of unidirectional potential 14 connected in series with adding polarities. The positive terminal of the first source of unidirectional potential 10 forms the B+ bus, the junction of the first source of unidirectional potential 10 and the second source of unidirectional potential 12 is connected to some point of reference potential such as ground to provide a ground bus, the junction of the second source of unidirectional potential 12 and the third source of unidirectional potential 14 forms a negative bus designated as the $B_1$— bus, and the negative terminal of the third source of unidirectional potential 14 forms a negative bus designated as the $B_2$— bus. One side of each of the gating photocells A, B, and C is connected to the $B_2$— bus, and the other side of each of the gating photocells A, B, and C is connected through a resistor 16 to the B+ bus. The junctions of the gating photocells A, B, and C and the resistors 16 are respectively coupled to the base electrodes of the gating transistors 18, 20, 22 by means of capacitors 24. Each of the base electrodes of the gating transistors 18, 20, 22 is coupled to the junction of two rectifier devices 25 for clamping purposes. The rectifier devices 25 are coupled in series between the ground bus and a start bus to permit current to normally flow from the ground bus to the start bus. Each of the collector electrodes of the gating transistors 18, 20, 22 is coupled to the B+ bus by means of a resistor 26. The emitter electrodes of the gating transistors 18, 20, 22 are coupled together and coupled to the ground bus through suitable constant voltage devices such as one or more rectifier devices 28 which are poled to permit current to flow from the emitter electrodes to the ground bus. The collector electrodes of the gating transistors 18, 20 associated with the gating photocells A and C are coupled by rectifier devices 30 to the base electrode of a first amplifying transistor 32. The collector electrode of the gating transistor 22 associated with the gating photocell B is coupled to the base electrode of a phase reversing transistor 34. The collector electrode of the phase reversing transistor 34 is coupled through a rectifier device 30 to the base electrode of the first amplifying transistor 32, and through a resistor 26 to the B+ bus. The emitter electrode of the phase reversing transistor 34 is coupled to the common connection of the other emitter electrodes of the transistors 18, 20, 22 by means of a rectifier device 36. The phase reversing transistor 34 is provided with the gating transistor 22 associated with the photocell B for reasons that will be explained hereinafter. The base electrode of the first amplifying transistor 32 is coupled to the ground bus by a resistor 37. The emitter electrode of the first amplifying transistor 32 is coupled to the junction of two voltage divider resistors 38, 40 which are connected in series between the B+ bus and the ground bus. The collector electrode of the first amplifying transistor 32 is coupled to the base electrode of a second amplifying transistor 42, this base electrode being coupled through a resistor 44 to the $B_1$— bus. The emitter electrode of the second amplifying transistor 42 is coupled directly to the $B_1$— bus, and the collector electrode of the second amplifying transistor 42 is coupled through a resistor 46 to provide a gate bus. A Zener rectifier device 47 is coupled between the $B_1$— bus and the gate bus so that current normally flows from the $B_1$— bus towards the gate bus.

As shown in FIGURE 1, it has been assumed that the necessary gate code requires a dark square A, a light square B and a dark square C in that order. Consequently, the gate circuit shown in FIGURE 2*a* has been arranged so that it produces a gate or gating signal only in response to that combination of dark and light squares. Any number of squares in any combination or sequence of light and dark order may be used to provide a gate code. In the absence of a start or starting signal (which will be explained subsequently), the base electrodes of the gating transistors 18, 20, 22 are clamped at, or negative with respect to, the ground bus potential while the emitter electrodes are clamped at, or positive with respect to, the ground bus potential. Hence the gating transistors 18, 20, 22 do not conduct. Also under these conditions, the capacitors 24 have a charge which readily varies with respect to the ground potential in accordance with the the light intensity on the gating photocells A, B, and C. However, when a start or starting signal is received, the start bus is made to rise to a positive potential with respect to the ground potential (in a manner which will be explained) so that the rectifier devices 25 appear as an open circuit. This condition unclamps the base electrodes of the gating transistors 18, 20, 22 to enable them to have a variable potential in response to changes in light intensity on the gating photocells A, B, and C. When the proper gate code, namely a dark square A, a light square B, and a dark square C. is present before the gating photocells A, B, and C respectively, the gating photocells A and C appear as a relatively high resistance and the gating photocell B appears as a relatively low resistance. Under these conditions, the gating transistors 18, 20 conduct a relatively large amount of current, while the gating transistor 22 conducts a relatively small amount of current. However, the relatively small amount of current conducted by the gating transistor 22 causes the phase reversing transistor 34 to conduct a relatively large amount of current. With a relatively large amount of current flowing through the collector electrode resistors 26 associated with the gating transistors 18, 20 and associated with the phase reversing transistor 34, the voltage drop across these resistors 26 causes the rectifier devices 30 to appear as an open circuit. As a result, a relatively low voltage is present on the base electrode of the first amplifying transistor 32. This relatively low voltage on the base electrode causes the first ampilfying transistor 32 to conduct a relatively large amount of current, the effect of this large amount of current being to raise the voltage on the base electrode of the second amplifying transistor 42. This increased voltage on the base electrode of the second amplifying transistor 42 permits a current to flow and thereby produce a gate or gating signal on the gate bus. This gating signal is coupled to the readout circuit to perform some desired function and specifically to render the readout circuit operative.

With a gate circuit such as just described, if either of the gating photocells A or C appears as a relatively low resistance (as a result of an increased light intensity) or if the gating photocell B appears as a relatively high resistance (as a result of decreased light intensity), there will be no gating signal produced at or on the gating bus. Thus, the gate circuit produces a gate signal only in response to dark squares A and C in front of or scanned by the gating photocells A and C and in response to a light square B in front of or scanned by the gating photocell B. The phase reversing transistor 34 is provided in connection with the gating photocell B since the gating photocell B scans a light square while each of the gating photocells A and C scans a dark square. In order that the circuit effect of the gating photocell B be the same as the circuit effect of the gating photocells A and C, the reversing transistor 34 is provided. Persons skilled in the art will appreciate that the gating photocells A, B, and C may be made to scan any combination of light and dark squares and still produce the desired circuit effect.

*Start Scanner and Start Circuit*

As previously mentioned, a start scanner and start circuit may be provided generally to stabilize the circuits associated with the gate code scanners and the information code scanners, and to enable these circuits to produce a usable signal despite only slight differences in contrast between the coded indicia and the object, or between the dark and light areas of the coded indicia, shortly after these circuits have been exposed to widely varying light intensities. The start scanner may comprise a single starting light sensitive device or photocell which is normally illuminated by a light source on the opposite side of the conveyer as shown in FIGURE 1. Normally, in the absence of a package, a start scanner light source shines on the starting photocell of the start scanner. Thus, the starting photocell presents a relatively low resistance. However, when a package passes between the start scanner light source and the starting photocell, the starting photocell presents a relatively high resistance. As shown in FIGURE 2*a*, this starting photo cell is connected in series with a resistor 48 between the B+ and the $B_2$— busses. The junction of this resistor 48 and the starting photocell is connected to the base electrode of a starting transistor 50. The collector electrode of the starting transistor 50 is coupled to the B+ bus through a resistor 52 and the emitter electrode of the starting transistor 50 is coupled to the start bus. The start bus and the ground bus are coupled together by a Zener rectifier device 54 which is poled to permit normal current to flow from the ground bus towards the start bus. And, the start bus and the $B_1$— bus are coupled together by a resistor 55.

Under normal conditions, that is in the absence of a package on the conveyor, the start scanner light source shines on the starting photocell of the start scanner. Thus, the starting photocell appears as a low resistance with the result that the base electrode of the starting transistor 50 is relatively negative. Hence, the starting transistor 50 conducts substantially no current. However, as a package moves along the conveyer, it passes in front of the information code scanners, the gate code scanners, and then the start scanner. It is preferable that the package pass in front of the start scanner just before the gate and information codes are in front of their respective scanners so that the gate circuit and readout circuit are clamped as long as possible, thus reducing the effects of surrounding light. This, of course, requires properly locating the indicia on the package and properly locating the scanners with respect to the indicia and with respect to the start scanner light source. When the package does pass in front of the start scanner, that is between the start scanner light source and the starting photocell, the starting photocell appears as a relatively high resistance so that the base electrode of the starting transistor 50 becomes relatively positive. This causes the starting transistor 50 to conduct current and thereby raise the potential of the start bus in a positive direction (by an amount limited by the Zener rectifier device 54) to provide a starting signal. This starting signal is coupled to the rectifier devices 25 of the gate circuit and serves to open circuit these rectifier devices 25, thereby unclamping the base electrodes of the gating transistors 18, 20, 22 to enable the gating transistors 18, 20, 22 to conduct current in response to light changes on the gating photocells A, B, and C. The starting signal is also coupled to the readout circuit to unclamp and render the readout circuit operative.

*Information Code Scanner and Readout Circuit*

As shown in FIGURE 1, and as explained in connection therewith, four squares A, B, C, and D are utilized in the information code. As also mentioned, a light sensitive device is used in each of the four information code scanners. FIGURE 2*b* shows one of these information code scanners and readout circuits. It is to be understood, however, that additional information code scanners and readout circuits would be used, one such scanner and readout circuit being used for each of the squares or bits of coded indicia used. Thus, for the arrangement shown in FIGURE 1, there would be four information code scanners and readout circuits such as the one shown in FIGURE 2*b*. The information code scanner comprises an information light sensitive device or photocell coupled in series with a resistor 56 between the B+ and $B_2$— busses. The junction of this resistor 56 and the information photocell is coupled through a capacitor 58 to a bistable multivibrator circuit 60 at the base electrode of a first transistor 62. This multivibrator circuit 60 also comprises a second transistor 64. The respective collector electrodes of the first and second transistors 62, 64 are coupled through resistors 66 to the B+ bus, and the emitter electrodes of the first and second transistors 62, 64 are coupled together and coupled through a common resistor 68 to the $B_1$— bus. The collector electrode of the first transistor 62 is coupled through a resistor 70 to the base electrode of the second transistor 64, and this base electrode in turn is coupled to the gate bus by a resistor 72. The base electrode of the first transistor 62 is coupled to the junction of a pair of rectifier devices 74 which are coupled in series between the ground bus and start bus in such a manner that current normally passes through these rectifier devices 74 from the ground bus to the start bus. An output circuit may be coupled to either of the collector electrodes of the first or second transistors 62, 64 and to the ground bus. Or, an output circuit may be coupled between the collector electrodes of the first and second transistors 62, 64 as shown.

Under normal conditions, that is in the absence of starting and gating signals applied to the readout circuit, the second transistor 64 of the multivibrator circuit 60 is conducting, and the first transistor 62 is cut off. In the absence of starting and gating signals on the starting and gating busses, the base electrode of the first transistor 62 is clamped by the rectifier devices 74 at, or negative with respect to, the ground bus potential. The second transistor 64 is conducting current because of the voltage applied to its base electrode by the network of resistors 66, 70, 72. As a result, the emitter electrodes of both transistors 62, 64 are positive with respect to the ground bus potential. Thus the first transistor 62 cannot conduct current and the second transistor 64 cannot be cut off. However, when the starting transistor 50 conducts current to provide a starting signal, the rectifier devices 74 become an open circuit so that the base electrode potential of the first transistor 62 may rise in a positive direction. Likewise, when the second amplifying transistor 42 conducts current to provide a gating signal, the voltage on the base electrode of the second transistor 64 of the multivibrator 60 becomes less positive. Under these conditions, the multivibrator 60 may be switched. The starting and gating signals should be applied to the starting and gating busses at the same time that a square or bit of coded indicia is viewed or scanned by the information photocell. The information photocell appears as either a high or low resistance depending upon whether it scans a dark or a light square. In FIGURE 1, it has been assumed that the desired information code includes a dark square A. Hence, the information photocell A of the information code scanner appears as a relatively high resistance thereby causing the base electrode of the first transistor 62 to become relatively positive. This positive voltage causes the first transistor 62 to conduct current, and the conduction of current through the first transistor 62 causes the second transistor 64 to be turned off in the usual multivibrator action as a result of the resistor 70 connecting the collector electrode of the first transistor 62 and the base electrode of the second transistor 64. The change in potentials on the collector electrodes of the transistors 62, 64 provides an output signal which can be applied to a utilization circuit.

If the information photocell shown in the readout circuit in FIGURE 2*b* had seen a light square or bit of coded indicia, it would present a relatively low resistance in the readout circuit. Consequently, a relatively low voltage would be presented to the base electrode of the first transistor 62. The multivibrator circuit 60 and the readout circuit would maintain their condition with the second transistor 64 conducting. Thus, the voltage on the collector electrode of the second transistor 64 would remain relatively low, and no change in output signal would occur.

It should be emphasized again that although only one information code scanner and information readout circuit are shown, any number of such circuits may be used by connecting such circuits in a similar manner between the various busses shown in FIGURE 2*b*. Thus, any number of readout circuit signals can be provided to operate or control a utilization circuit. These various signals can be applied to relays which, when operated or activated in certain combinations, can cause any number of predetermined functions to take place. For example, if the information code shown in FIGURE 1 is scanned or viewed, a group of four relays could be set up or operated in such a manner that relays A and D were in one condition and in such a manner that relays B and C were in an opposite condition to cause a certain operation of the sorting gates to route or sort a package on the conveyer in a certain direction. It will be appreciated by persons skilled in the art that the code reading system of the invention lends itself readily to any number of applications and uses.

FIGURE 2*b* also shows a pair of reset signal terminals. These terminals are connected to the ground bus and to the base electrode of a reset transistor 76. The collector electrode of the reset transistor 76 is connected to the gate bus and the emitter electrode is connected to the ground bus. The reset signal can be a negative-going signal which is applied to the reset terminals in response to a certain condition such as when the package has been routed or sorted into the desired group. When this reset signal is applied, the reset transistor 76 conducts and causes the gate bus to become more positive (that is, to be placed at ground potential). When the potential of gate bus is so changed, it causes the second transistor 64 of the multivibrator 60 to conduct, thus resetting each of the readout circuits so that they may be receptive to signals applied to their respective information photocells.

FIGURE 2*c* shows one example of a utilization circuit which is particularly adapted to be used with the reading system just described. In FIGURE 2*c*, it will be seen that four code groups are provided, there being one for each of the information code squares A, B, C, and D. Hence four readout circuits would be required. As mentioned above, only one readout circuit has been shown, but it is to be understood that readout circuits similar to the circuit shown in FIGURE 2*b* are to be provided for each of the utilization circuits. FIGURE 2*c* also shows legends indicating three groups of relays. Four utilization circuits are provided and would be used for the group No. 1 relay. Likewise, four utilization circuits are provided for the group No. 2 relay, and four utilization circuits are provided for the group No. 3 relay. Any number of group of relays may be used. If the number of relays is increased, it is possible to have a more versatile system in that more readout codes may be set up. Each of the utilization circuits comprises a switch arm which is adapted to engage either of the two leads connected to the collector electrodes of the multivibrator transistors of the readout circuit. This switch arm is coupled through a rectifier device and a resistor to the ground bus shown in FIGURE 2*b*. The relay of each group is connected across the resistor. The arm of each utilization circuit switch is thrown in accordance with a predetermined information code. As will be recalled in FIGURE 1, the information code was assumed to comprise a dark square A, a light square B, a light square C, and a dark square D. Thus for relay group No. 1, the utilization circuit switch arm associated with readout circuit No. 1 (i.e., square A) is thrown to the left or the "dark" terminal, the switch arms associated with readout circuits Nos. 2 and 3 (i.e., squares B and C respectively) are thrown to the "light" terminal, and the switch arm associated with readout circuit No. 4 (i.e., square D) is thrown to the "dark" position. If FIGURES 2*b* and 2*c* are considered together, it will be seen that when a proper information code indicia is in front of the information code scanners, the multivibrator transistors associated with the respective "dark" and "light" terminals will conduct. Under this condition, a relatively low voltage will be applied to each of the switch arms, with the result that no voltage appears across any of the resistors associated with the group No. 1 relay. Under this condition, a predetermined function, such as the operation of a mechanical gate which sorts a package into a predetermined group or area can be made to take place. If any one of the multivibrator transistors which should be conducting is not conducting because of an incorrect square before its scanner, a voltage will be applied to the switch arm associated with that transistor. This voltage will then be present across the resistor associated with the group No. 1 relay. Hence, a mechanical function will not take place. As mentioned, additional groups of relays and readout circuits may be provided so that any number of code sequences or arrangements may be set up.

Persons skilled in the art will readily appreciate that any number of light sensitive devices, including one, can be used in the gate code scanner and in the information code scanner. Thus, the variable number of light sensitive devices permits a large number of code arrangements to be used on objects which are to be scanned. The code reading system permits and provides simultaneous scanning of all the squares or coded bits on indicia despite only slight differences in contrast between the bits of indicia and despite a wide range of light intensities just prior to scanning. And, the code reading system provides an arrangement which can be used in conveyers having a wide range of speeds, as only a short interval of time is needed to scan the squares or coded bits of indicia. And, while the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. A code reading system for scanning an object having a plurality of bits of coded indicia thereon and producing signals in response thereto comprising light sensitive means that simultaneously scan each of said bits of coded indicia on said object and produce a number of first signals each of which is respectively indicative of one of said bits of coded indicia, readout circuit means coupled to said light sensitive means for producing a number of output signals each of which is respectively indicative of one of said first signals, said readout circuit means being adapted to simultaneously produce said output signals in response to a gate signal applied to said readout circuit, a gate circuit coupled to said readout circuit for applying said gate signal thereto at a predetermined time whereby said readout circuit means may produce said output signals, and a start circuit coupled to said gate circuit for enabling said gate circuit to produce said gate signal prior to said scanning.

2. A code reading system for scanning objects each having at least one bit of information code thereon and for producing signals in response thereto and for scanning objects each having at least one bit of gate code thereon comprising a plurality of scanning devices arranged for scanning said bits of code, said scanning devices including information scanning devices for scanning said information code and gate scanning devices for scanning said gate code and producing information and gate signals respectively in response to said bits of code, a readout circuit respectively coupled to each of said information scanning devices for producing an output signal in response to its respective information signal, said readout circuits being adapted to simultaneously produce said output signals in response to a gating signal applied to said readout circuits, a gate circuit coupled to said gate scanning devices and to each of said readout circuits for producing and applying said gating signal to said readout circuits in response to a predetermined gate code, and a start circuit coupled to each of said readout circuits and to said gate circuit for enabling said readout circuits and said gate circuit prior to said scanning.

3. A code reading system for scanning objects, each of which has a plurality of bits of information code thereon and each of which has a plurality of bits of gate code thereon, and for producing signals indicative of said information code, comprising a plurality of light-sensitive information scanning devices respectively arranged to correspond with and to scan said bits of information code simultaneously and to produce first signals respectively indicative of said bits of information code, an information readout circuit respectively coupled to each of said information scanning devices for producing an information signal indicative of its respective first signal, said readout circuits being normally incapable of producing said information signals in the absence of a gate signal applied thereto and in the absence of a start signal applied thereto, a plurality of light-sensitive gate scanning devices respectively arranged to correspond with and to scan said bits of gate code simultaneously and to produce second signals respectively indicative of said bits of gate code, a gate circuit coupled to said gate scanning devices for producing a gate signal in response to said second signals and to a predetermined arrangement of said bits of gate code, said gate circuit being normally incapable of producing said gate signal in the absence of a start signal, means coupling said gate circuit to said readout circuits for applying said gate signal thereto and rendering said readout circuits operable in response to said gate signal, a start circuit, said start circuit being arranged to provide a start signal in response to the presence of said object, and means coupling said start circuit to said gate circuit and to said readout circuits for rendering said gate circuit and said readout circuits operable in response to said start signal.

4. A code reading system for scanning objects, each of which has a plurality of bits of information code thereon and each of which has a plurality of bits of gate code thereon, and for controlling a utilization circuit in a manner indicative of said information code, comprising a plurality of light-sensitive information scanning devices respectively arranged to correspond with and to scan said bits of information code simultaneously and to produce first signals respectively indicative of said bits of information code, a readout circuit respectively coupled to each of said information scanning devices for producing an information signal indicative of its respective first signal, said readout circuits being normally incapable of producing said information signals in the absence of a gate signal applied thereto and in the absence of a start signal applied thereto, a plurality of light-sensitive gate scanning devices respectively arranged to correspond with and to scan said bits of gate code simultaneously and to produce second signals respectively indicative of said bits of gate code, a gate circuit coupled to said gate scanning devices for producing a gate signal in response to said second signals and to a predetermined arrangement of said bits of gate code, said gate circuit being normally incapable of producing said gate signal in the absence of a start signal, means coupling said gate circuit to said readout circuits for applying said gate signal thereto and rendering said readout circuits operable in response to said gate signal, a start circuit, said start circuit being arranged to provide a start signal in response to the presence of said object, means coupling said start circuit to said gate circuit and to said readout circuits for rendering said gate circuit and said readout circuits operable in response to said start signal, and a utilization circuit coupled to said readout circuits for providing one electrical circuit in response to a predetermined combination of information signals from said readout circuits and for providing another electrical circuit in response to another combination of information signals from said readout circuits.

5. The invention defined in claim 4 and further comprising a conveyor for distributing said objects in response to said utilization circuit.

6. A code reading system for scanning an object having a plurality of bits of coded indicia thereon and producing signals in response thereto comprising light sensitive means that scan each of said bits of coded indicia on said object and produce a number of first signals each of which is respectively indicative of one of said bits of coded indicia, readout circuit means coupled to said light sensitive means for producing a number of output signals each of which is respectively indicative of one of said first signals, said readout circuit means being adapted to produce said output signals in response to a gate signal applied to said readout circuit, a gate circuit coupled to said readout circuit for applying said gate signal thereto at a predetermined time whereby said readout circuit means may produce said output signals, and a start circuit coupled to said gate circuit for enabling said gate circuit to produce said gate signal prior to said scanning.

References Cited in the file of this patent

UNITED STATES PATENTS

| | | |
|---|---|---|
| 2,594,358 | Shaw | Apr. 29, 1952 |
| 2,714,841 | Demer et al. | Aug. 9, 1955 |
| 2,795,328 | Tyler | June 11, 1957 |
| 2,872,590 | Leavens | Feb. 3, 1959 |
| 2,991,369 | Grewe | July 4, 1961 |